United States Patent [11] 3,631,329

[72] Inventor Robert L. Kimball
725 Saddlewood Avenue, Dayton, Ohio 45459
[21] Appl. No. 29,598
[22] Filed Apr. 17, 1970
[45] Patented Dec. 28, 1971

[54] ISOLATION CIRCUIT FOR PROGRAM SIGNALS
5 Claims, 5 Drawing Figs.

[52] U.S. Cl. .......... 321/2, 324/118, 330/10
[51] Int. Cl. .......... H02m 3/32, G01r 19/18, H03f 3/38
[50] Field of Search .......... 321/2.8; 324/118; 330/10

[56] References Cited

UNITED STATES PATENTS 3,430,125 2/1969 Povenmire et al. .......... 321/2
3,008,090 11/1961 Millis et al. .......... 330/10
3,156,859 11/1964 Cox .......... 324/118 UX

OTHER REFERENCES

Radio-Electronics, " The Two-State Amplifier," pp. 54–56, July 1965

*Primary Examiner*—William H. Beha, Jr.
*Attorneys*—Harry A. Herbert, Jr. and Robert Kern Duncan

ABSTRACT: Through a modulation-demodulation system having an offset control to reestablish a zero reference, relatively slowly changing single-ended (grounded) electrical direct current input signals are converted to a "floating" potential that may readily be applied to bridge and other electrical devices that require a fully floating input signal. The direct current input potential is modulated (chopped) at a frequency many times removed (higher) than the effective frequency of the input signal. The modulation is then removed by a balanced demodulator using the same chopping frequency providing a floating output signal.

INVENTOR.
ROBERT L. KIMBALL
BY Harry A. Herbert Jr. and
Robert Kern Duncan
ATTORNEYS INVENTOR.
ROBERT L. KIMBALL
BY Harry A. Herbert Jr and Robert Kern Duncan
ATTORNEYS

ISOLATION CIRCUIT FOR PROGRAM SIGNALS

BACKGROUND OF THE INVENTION

The field of the invention is in the art of direct current isolation amplifiers for measuring devices.

Isolation amplifiers for alternating current are well known and extensively used. U.S. Pat. No. 3,348,160 to F. G. Lee et al. is an example of such a device. Isolation amplifiers for direct currents are not so common and the maintaining of linearity, a stable zero, and desirable temperature characteristics has been a serious problem. U.S. Pat. No. 3,058,066 to R. J. Redding et al. discloses one approach to the problem. Generally with circuits such as set forth therein, linearity, stability, and lack of means to establish a stable zero output for zero input have seriously restricted their utility.

SUMMARY OF THE INVENTION

The invention discloses a direct current isolation amplifier with very good linearity and stability having a floating DC output potential that is derived directly from a single-ended input signal.

DESCRIPTION OF THE PREFERRED EMBODIMENTS

The embodiment further described in detail is particularly suited for coupling single-ended (one side grounded) program signals to fully floating temperature controllers. In this particular use of this embodiment, high-temperature thermocouples are welded to the device under test which is usually a large metallic structure integral with the system electrical ground. It is generally easy enough to have the connecting wires of the thermocouples above ground, that is, neither one at ground potential. The thermocouple outputs are usually connected into the arms of bridge circuits in which a comparison with a programmed input signal is made. The output of the bridge (the difference signal between the thermocouple readings and the program magnitudes) actuates servomechanisms acting on the device being tested so as to change the device under test so that the output from the thermocouples is made essentially to match the program signals. The difficulty arises in that program signals are generally a single-ended (one side grounded) type of signal. Insertion of these single-ended program signals into the bridge circuits results in the grounding of different potential points in the bridges, ground loop currents, and in effect destroys the accuracy, if not the operation of the bridge circuits. The invention provides for the elimination of the ground condition and provides a floating potential input to the bridge circuits that is a faithful replica of the grounded program control signals.

Obviously, the invention is not limited to the foregoing utility example, but may be used wherever it is desirable to convert single-ended (grounded) signals having a single determined polarity with respect to ground, i.e., signals of varying magnitude in one direction from ground, to a proportional isolated (floating) potential.

Figure 1:
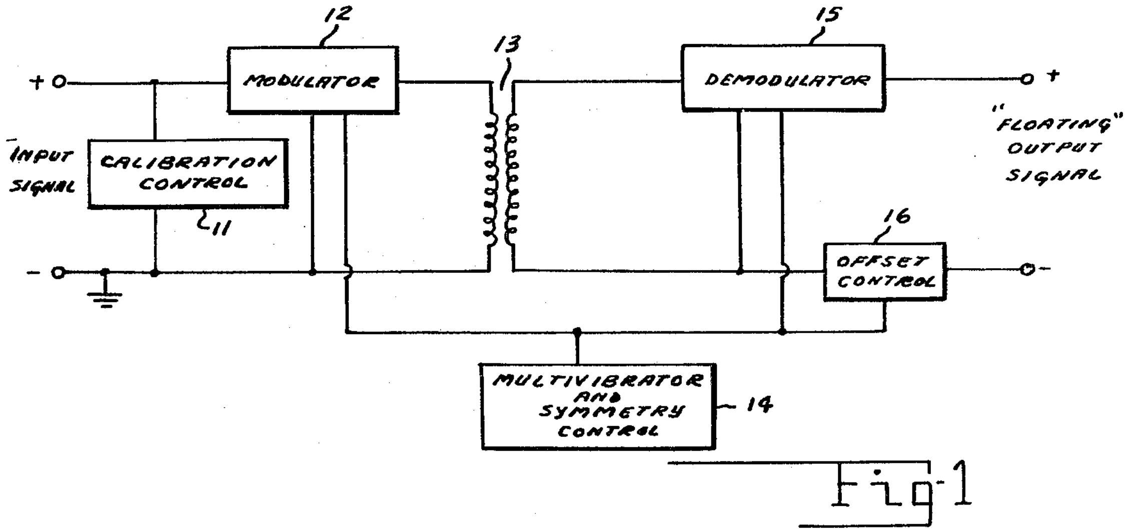
FIG. 1 is a block diagram of the invention.
Figure 3A:
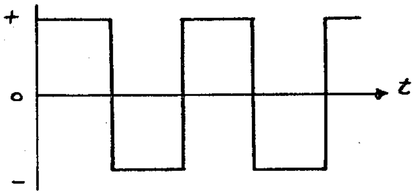
FIGS. 3*a*, 3*b*, and 3*c* are typical waveform representations of the effect of the symmetry control on the output of the chopping oscillator.
Figure 3B:
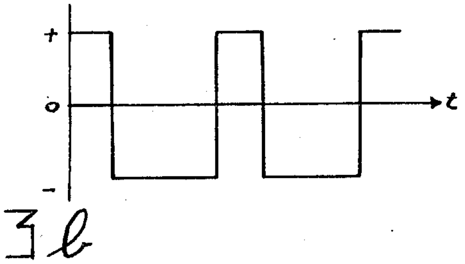
Figure 3C:
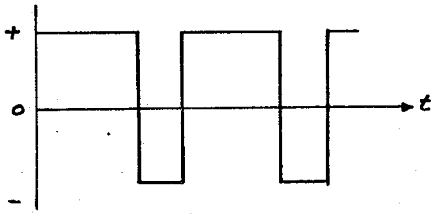

Referring to FIG. 1, the grounded input signal varies in a positive direction from ground potential. The calibration control 11 adjusts the ratio of the magnitude of the output signal to that of the magnitude of the signal applied to the input terminals by attenuating the amount of the input signal that is applied to the modulator 12. In order to match the requirements of a particular application, an embodiment of the invention provides a 0 to 50 millivolts floating output signal for a 0 to +50 volts input signal. Other ratios may readily be obtained by changing the magnitude of the input signal entering the modulator and by changing the ratio of the primary winding to the secondary winding of the coupling transformer.

The multivibrator and symmetry control 14 provides the relatively high-frequency signal used to modulate the input signal so that it may be passed by transformer 13 and isolated from ground. This same signal is also applied to the demodulator 15 and the offset control 16. The demodulator 15 removes the modulation frequency from the signal and, through suitable filtering, transients are eliminated and an ungrounded signal representative of the input signal is provided at the output terminals. The offset control 16 provides a voltage to counteract any small voltage appearing at the output terminals when no input voltage is present on the device.

Figure 2:
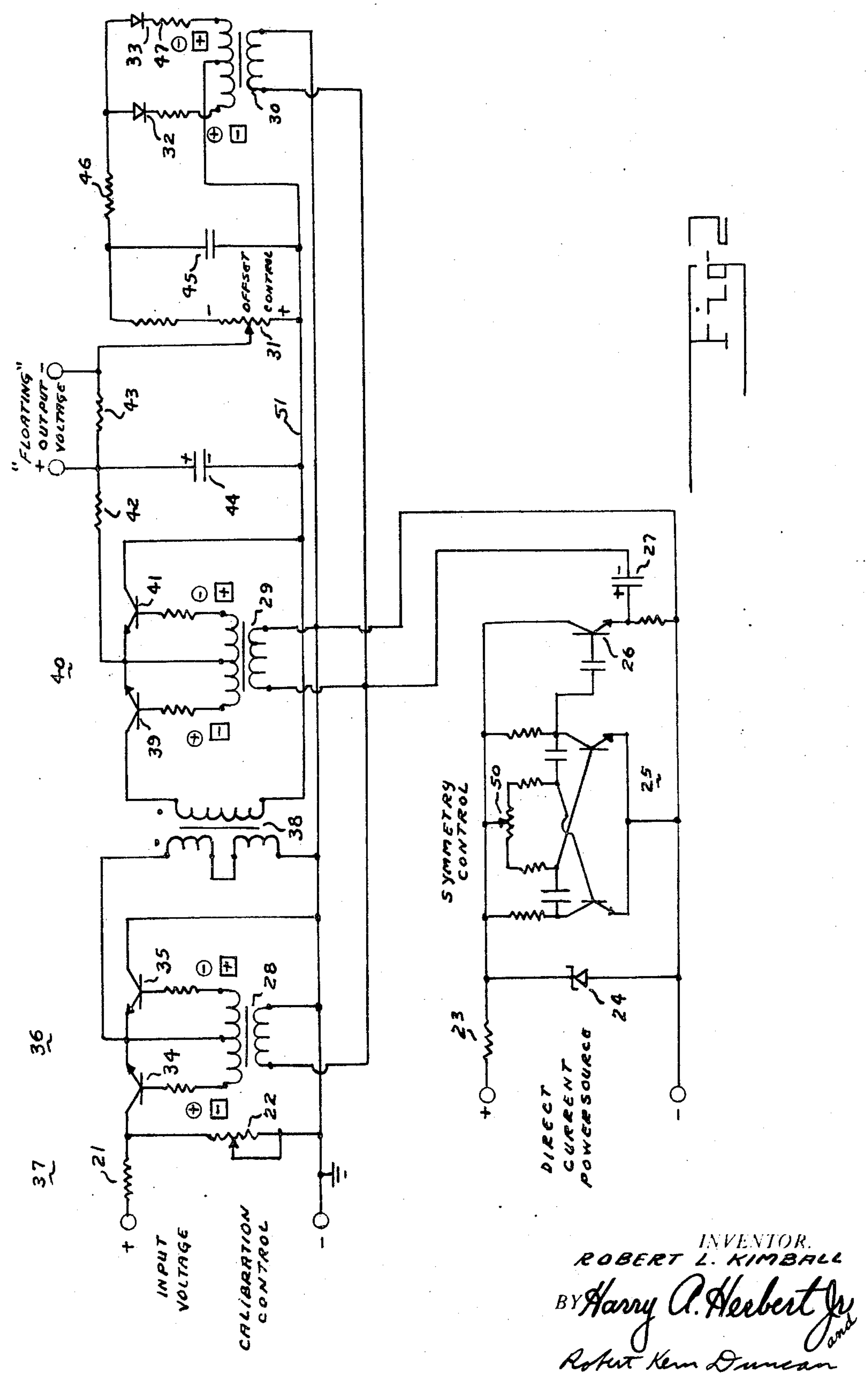
FIG. 2 is a schematic diagram of an embodiment of the invention.

A detailed schematic diagram of an embodiment of the invention is shown in FIG. 2. The input voltage signal is attenuated by the voltage divider comprising the input resistance 21 and the adjustable potentiometer 22, and applied to modulator 36. Adjustment of potentiometer 22 provides for calibrating the device by setting a determined ratio between the output signal and the input signal.

The voltage from the conventional external direct current power source is regulated to a constant potential by resistor 23 and zener diode 24. This regulation may be included in the power source. Multivibrator 25 generates essentially a square wave signal that is emitter-follower buffered by transistor 26 and capacity coupled by capacitance 27 to the primaries of driver transformers 28, 29, and 30. Obviously, since no circuit is perfect, some distortion will appear in the signal on primaries of the driver transformers due to the reactive nature of the impedance seen by the emitter-follower. It is necessary for best operation that the frequency generated by multivibrator 25 be many times (such as a thousand) higher than the highest effective alternating frequency component of the changing input signal. For the application previously discussed, a frequency in the range of 10 to 14 kHz. has been found to be very satisfactory. It is also necessary that the peak-to-peak amplitude of the chopping frequency at the secondary (output) terminals of the driver transformers 28 and 29 be greater than the maximum DC signal appearing in the modulator and demodulator, respectively, and that the rectified voltage from transformer 30 be large enough in magnitude that any spurious (offset) voltage that would appear at the output terminals with zero voltage input may be offset by control 31. In this embodiment a small offset voltage having the polarity shown in FIG. 2 effectively neutralizes the small negative voltage (negative, meaning in opposite polarity to the normal output) that would otherwise appear at the output terminals with no signal input to the device. Those skilled in the art will readily understand that if in a particular embodiment of the invention an offset voltage of opposite polarity is required it may be provided by merely reversing the polarity of the diodes 32 and 33. This situation may arise due to the particular components used in the construction of the device.

The operation of the device may best be understood by briefly considering the operating characteristics. When the polarity of the square wave at the secondary of transformer 28 is that shown by the small circles, transistor 34 is biased fully on, so that its collector-to-emitter resistance is nearly zero. At the same time transistor 35 is completely cut off, so that its emitter-to-collector resistance is nearly infinite. Therefore, the input signal value to the modulator 36, as scaled by the calibrating system 37, during this interval of time (approximately one-half the period of the square wave chopping signal, as determined by the symmetry control) is transferred to the primary of isolation transformer 38. The transformer 38 is poled such that this signal, through transformer action, appears as a positive potential at the collector of transistor 39. (Note that there is no DC ground path from the modulator 36 to the demodulator 40.)

Transistors 39 and 41 are in the same relative condition as transistors 34 and 35 with respect to the driving signal (chopping wave). Thus the signal current being traced appears across the resistances 42, 43, that portion of the offset control 31 between the slider and the lower end of the control, and the filtering capacitor 44. In a typical embodiment of the invention, resistance 42 has a value of 180 ohms, resistance 43 a value of 100 ohms, the total resistance of the potentiometer 31 is 200 ohms and the value of capacitor 44 is one microfarad. With these values in this particular embodiment, the noise peaks and carrier are filtered out and the output arrives at a steady-state value after approximately five half ("charging") cycles of the multivibrator frequency (10 kHz).

Carrying the operation of the embodiment on to the generation of the offset voltage under this polarity of the multivibrator frequency, i.e., the polarity portrayed by the small circles, diode 33 conducts and capacitor 45 is charged through resistors 46 and 47. In the same particular embodiment previously discussed, resistance 46 is 1,000 ohms, resistance 47 is 400 ohms, and capacitor 45 is 25 microfarads. With these values, steady state is reached in about 5 cycles (5 half-cycle pulses) of the multivibrator frequency.

Considering the other half-cycle operation, i.e., when the polarities shown in the small squares exist, transistor 34 is cut off and transistor 35 is fully conducting. Since transistor 35's collector-to-emitter resistance is very low the upper end (·) of transformer 38 is very near ground potential. However, since the resistance is not exactly zero, and since distributed capacitance from the secondary to the primary of transformer 28 can (and does to some extent) supply a ground return for the chopping frequency signal, a small signal due to the base current of transistor 34 may exist on the (·) end of the primary of transformer 38. Also, since a reverse-biased junction is not quite an infinite resistance, some leakage through the base-to-emitter junction of transistor 34 occurs. This latter effect would be opposite in effect to that of the base current of transistor 35, and, if equal in magnitude, the two would generally tend to cancel. However, it is well understood, that generally due to small differences existing in practical components, cancellation would rarely occur and that the resultant of these variations would be coupled through transformer 38 and further be reinforced, or decreased, by a similar disturbance generated in transistors 39 and 41. The net result of these effects appears as an unwanted (offset) potential at the output. It has been found empirically that generally this is a small negative voltage. Thus a small negative offset voltage, with respect to line 51, is generated that may be varied in magnitude to effectively cancel the unwanted negative voltage appearing at the output of the device when no input voltage is present. It is to be noted that a negative potential at potentiometer 31 with respect to line 51 would tend to produce a positive output voltage. (As previously stated, a small positive voltage may be generated and used to offset an unwanted positive (offset) voltage in those embodiments where this condition exists.)

When transistors 34 and 39 are conducting some reverse leakage occurs across the base-to-emitter junctions of transistors 35 and 41, thus changing the desired equivalent signal magnitude by a small (but not negligible) amount. These errors are to some extent dependent upon the amplitude of the input signal. I have found that by changing the time relationship of the positive-to-negative portion of the chopping frequency (without changing the amplitude or frequency) that the linearity of the entire system may be greatly improved. The symmetry control potentiometer 50 in the multivibrator 25 changes the square wave output of the multivibrator as shown (idealized) in FIGS. *3a*, *3b*, and *3c*. With the control approximately in its midposition, a "square" wave output having essentially equal positive and negative energy contents is produced as shown in FIG. *3a*. Moving the control offcenter then will provide for example either the condition shown in FIG. *3b* or FIG. *3c*. Equal arbitrary amounts of time displacements are shown in the two wave shapes. These are representative values only, shown for illustration. The direction and amount of divergence from the balanced square wave to effect the maximum linearity capabilities of the device depends upon the components used in the construction of the device. In placing the system in operation the input-to-output voltage ratio is set by the calibration control 22, any voltage appearing at the output with zero input is canceled by the offset control 31, and the symmetry control 50 is adjusted to provide the optimum linearity between the input and output signals. These controls are generally not completely independent and some readjustment of each is usually desirable to obtain the optimum capabilities of the system. For duplicate embodiments, using conventional components (identical within standard tolerances), it has been found that essentially identical settings of the controls will generally provide very close to the optimum results.

By merely changing transistors 34, 35, 39, and 41 from NPN-type transistors (as shown) to PNP-type transistors, input signals swinging negatively from ground are converted to an isolated floating signal with the polarity of the output also reversed from that as shown in the FIGS. 1 and 2. (The offset cancellation voltage may also be reversed, if necessary, as previously explained.)

I claim:

1. An isolation circuit for converting grounded input signals having a single determined polarity with respect to ground to representative ungrounded floating output signals, comprising:
   a. means for attenuating the input signal to provide a determinable calibration ratio between the input signal magnitude and the output signal magnitude;
   b. means for providing a chopping wave having essentially a constant amplitude, and constant frequency;
   c. means responsive to the said attenuated input signal, cooperating with the said chopping wave, for providing a grounded modulated signal;
   d. an isolation transformer cooperating with the said grounded modulated signal for providing an ungrounded modulated signal;
   e. means responsive to the said ungrounded modulated signal, cooperating with the said chopping wave, for demodulating the ungrounded modulated signal and providing an ungrounded output signal representative of the grounded input signal; and
   f. means for controlling the ratio of the positive-to-negative energy content of the said chopping wave for compensating the normal variations in circuit components of the said foregoing means (c) and (e), and the said isolation transformer, for improving the linearity of the ungrounded output signals with respect to the said input signals.

2. An isolation circuit for converting a single-ended, changing, direct current input signal, having a maximum effective frequency alternating current component and a determined maximum magnitude, to a proportionally representative floating output signal, comprising;
   a. means for attenuating the input signal to provide a determinable calibration ratio between the input signal magnitude and the output signal magnitude;
   b. means for providing a chopping wave of determined constant peak-to-peak amplitude, and a determined constant frequency;
   c. means responsive to the said attenuated input signal, cooperating with the said chopping wave, for providing a grounded modulated signal;
   d. an isolation transformer cooperating with the said grounded modulation signal for providing an ungrounded modulated signal;
   e. means for providing a variable direct current offset potential;
   f. means responsive to the said ungrounded modulated signal, cooperating with the said chopping wave and the said direct current offset potential means for demodulating the ungrounded modulated signal and providing an ungrounded output signal proportional to the said input signal; and g. means for controlling the positive-to-negative energy content of the said chopping wave for compensating the normal variations in circuit components of the said foregoing means (c) and (f), and the said isolation transformer, for improving the linearity of the ungrounded output signal with respect to the said input signal.

3. The isolation circuit as claimed in claim 2 wherein the said demodulating means includes means for filtering noise peaks and the chopping frequency from the said output signal.

4. The isolation circuit as claimed in claim 3 wherein the said determined frequency of the chopping wave is at least approximately 1,000 times higher in frequency than the said maximum effective frequency alternating current component of the input signal.

5. The isolation circuit as claimed in claim 4 wherein the said determined constant peak-to-peak amplitude of the chopping wave is greater than the said attenuated input signal.

* * * * *